United States Patent
Konanur et al.

(10) Patent No.: US 9,661,446 B2
(45) Date of Patent: *May 23, 2017

(54) NEAR FIELD COMMUNICATIONS (NFC) COIL WITH EMBEDDED WIRELESS ANTENNA

(71) Applicant: Intel Corporation, Santa Clara, CA (US)

(72) Inventors: Anand S. Konanur, Sunnyvale, CA (US); Ulun Karacaoglu, San Diego, CA (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/839,413

(22) Filed: Aug. 28, 2015

(65) Prior Publication Data
US 2016/0066128 A1    Mar. 3, 2016

Related U.S. Application Data

(63) Continuation of application No. 13/977,586, filed as application No. PCT/US2012/031328 on Mar. 30, 2012, now Pat. No. 9,125,007.

(51) Int. Cl.
*H04B 5/00* (2006.01)
*H04M 1/00* (2006.01)
(Continued)

(52) U.S. Cl.
CPC ............ *H04W 4/008* (2013.01); *H01Q 5/321* (2015.01); *H01Q 5/40* (2015.01); *H01Q 7/00* (2013.01);
(Continued)

(58) Field of Classification Search
CPC .......... H01Q 1/243; H01Q 7/00; H04B 1/116; H04B 1/40; H04B 1/0274; H04B 1/7253;
(Continued)

(56) References Cited

U.S. PATENT DOCUMENTS 7,268,687 B2 *  9/2007  Egbert ............ G06K 19/07749
                                                340/572.4
7,917,103 B2    3/2011  Feher
(Continued)

FOREIGN PATENT DOCUMENTS

CN    102214317 A    10/2011
JP    10-327009 A    12/1998
(Continued)

OTHER PUBLICATIONS

Office Action received for Korean Patent Application No. 10-2014-0127913, mailed on Sep. 21, 2015, 2 pages of English Translation and 3 pages of Korean Office Action.
(Continued)

*Primary Examiner* — Quochien B Vuong
(74) *Attorney, Agent, or Firm* — Eschweiler & Potashnik, LLC

(57) ABSTRACT

Described herein are techniques related to near field coupling and WLAN dual-band operations. For example, a WLAN dual-band utilizes the same coil antenna that is utilized for near field communications (NFC) functions. The WLAN dual-band may be integrated into an NFC module to form a single module.

20 Claims, 4 Drawing Sheets

(51) Int. Cl.
| | |
|---|---|
| *H04W 4/00* | (2009.01) |
| *H01Q 7/00* | (2006.01) |
| *H01Q 5/40* | (2015.01) |
| *H01Q 21/28* | (2006.01) |
| *H04W 88/06* | (2009.01) |
| *H01Q 5/321* | (2015.01) |
| *H01Q 9/16* | (2006.01) |

(52) U.S. Cl.
CPC ............ *H01Q 21/28* (2013.01); *H04W 88/06* (2013.01); *H01Q 9/16* (2013.01)

(58) Field of Classification Search
CPC ........ H04B 5/00; H04B 5/005; H04B 5/0081; H04B 5/0087; H04B 5/0093; H04M 1/0274; H04M 1/7253; H04M 2250/04
USPC ... 455/41.1, 41.2, 552.1, 553.1, 90.3, 575.7; 343/702, 741, 742, 787, 788, 866, 867
See application file for complete search history.

(56) References Cited

U.S. PATENT DOCUMENTS

| | | | |
|---|---|---|---|
| 8,344,959 B2* | 1/2013 | Autti | ............ H01Q 1/243 |
| | | | 343/743 |
| 8,907,858 B2 | 12/2014 | Yang et al. | |
| 8,989,809 B2 | 3/2015 | Gu et al. | |
| 2007/0015555 A1 | 1/2007 | Bogner | |
| 2008/0076366 A1 | 3/2008 | Rofougaran | |
| 2008/0081631 A1 | 4/2008 | Rofougaran | |
| 2008/0233868 A1 | 9/2008 | Rofougaran et al. | |
| 2010/0279734 A1 | 11/2010 | Karkinen et al. | |

FOREIGN PATENT DOCUMENTS

| | | |
|---|---|---|
| JP | 2004-513464 A | 4/2004 |
| JP | 2004-240899 A | 8/2004 |
| JP | 2006-005903 A | 1/2006 |
| WO | 02/39379 A1 | 5/2002 |
| WO | 2013/147823 A1 | 10/2013 |

OTHER PUBLICATIONS

Extended European Search Report received for European Patent Application No. 12774402.7, mailed on Nov. 12, 2015, 8 pages.

Office Action received for Chinese Patent Application No. 201280072127.3, mailed on Sep. 14, 2015, 10 pages of Chinese Office Action only.

Office Action received for Japanese Patent Application No. 2015-503168, mailed on Oct. 20, 2015, 5 pages of English Translation and 6 pages of Japanese Office Action.

International Preliminary Report on Patentability and Written Opinion received for PCT Patent Application No. PCT/US2012/031328, mailed on Oct. 9, 2014, 5 pages.

International Search Report and Written Opinion received for PCT Patent Application No. PCT/US2012/031328, mailed on Nov. 14, 2012, 8 pages.

Suh, Seong-Youp, et al. "A miniaturized dual-band dipole antenna with a modified meander line for laptop computer application in the 2.5 and 5.25 GHz WLAN band", IEEE, Antennas and Propagation Society International Symposium 2006, pp. 2617-2620.

* cited by examiner

NEAR FIELD COMMUNICATIONS (NFC) COIL WITH EMBEDDED WIRELESS ANTENNA

RELATED APPLICATION

This application is a continuation of an claims priority to U.S. patent application Ser. No. 13/977,586 filed on Jun. 28, 2013 and entitled "NEAR FIELD COMMUNICATIONS (NFC) COIL WITH EMBEDDED WIRELESS ANTENNA", which is a United States National Stage filing of PCT Application No. PCT/US2012/031328 filed on Mar. 30, 2012.

BACKGROUND

Technologies have arisen that allow near field coupling (such as wireless power transfers (WPT) and near field communications (NFC)) between devices (e.g., portable electronic devices, tablet computers, etc.) in close proximity to each other. NFC may use radio frequency (RF) antennas in the devices to transmit and receive electromagnetic signals. Because of user desires (and/or for esthetic reasons) many of these devices are small, and are becoming smaller. Such devices tend to have exaggerated aspect ratios when viewed from the side. As a result, many of these devices incorporate flat antennas, which may use coils of conductive material as radiating antennas for use in near field coupling.

Wireless (radio) communications may require a separate embedded antenna component for wireless local area networks (WLAN), wireless wide-area network (WWAN), metropolitan area network (MAN), long term evolution (LTE), global positioning system (GPS), and the like. NFC and the wireless communications (e.g., WLAN, WWAN, etc.) components (e.g., antenna) of the devices may require significant space in the device. In other words, the NFC and the wireless communications devices may be competing for a very limited space for antennas on the device. The limited space becomes more a challenging from a design perspective, as the device gets thinner and packaging embedded antennas into the device may compromise the performance of the NFC and other wireless communications. Accordingly, a solution may be implemented to provide efficient performance of NFC and the other wireless communications in the device.

Figures 1A, 1B:
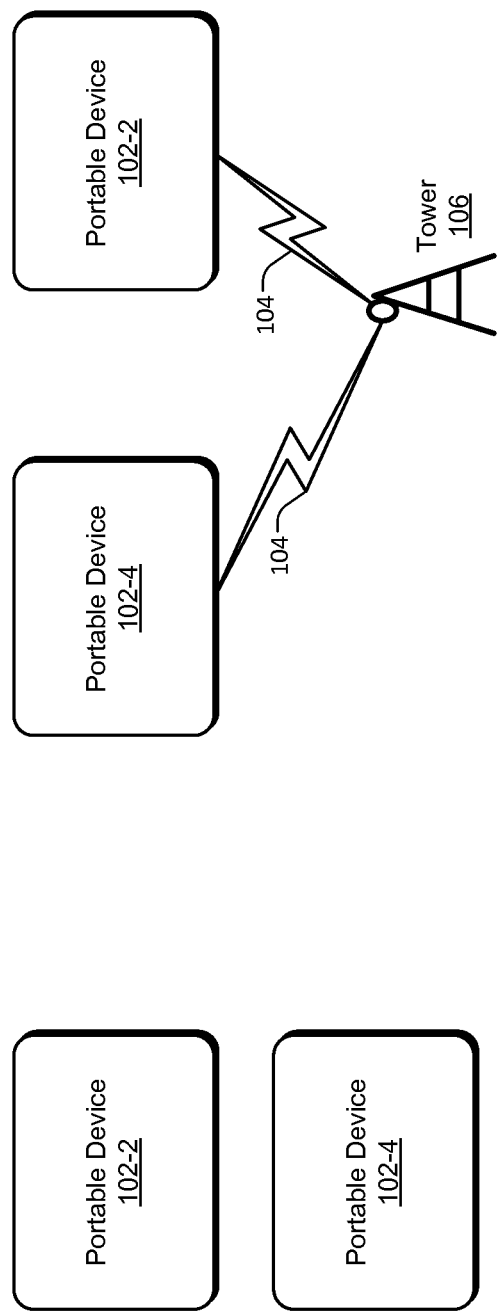
FIG. 1A illustrates an example near field coupling arrangement between devices to perform near field communications (NFC) related functions.
FIG. 1B illustrates an example wireless communications arrangement between devices that includes wireless local area network (WLAN) dual-band operation.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for coupling antennas of devices and more particularly for utilizing the same coil antenna of devices as embedded antenna for wireless communications and near field coupling capabilities of the devices. Near field coupling includes (by way of illustration and not limitation) near field communications (NFC) and/or wireless power transfer (WPT) capabilities of the devices. Wireless communications include (by way of illustration and not limitation) WLAN, MAN, WWAN, LTE, GPS, other form of WiFi and radio communications, and the like. For example, the WLAN may utilize a coil antenna that is used for NFC related functions. In this example, a WLAN (dual-band) module may be integrated with a NFC module to form a single module. The single module may be connected to the coil antenna that receives, transmits, or carries electrical signals for both WLAN dual-band operations and NFC operations. In an implementation, the WLAN dual-band operations may operate at relatively high frequency electrical signals, such as 2.4 GHz or 5.2 GHz frequency electrical signals under IEEE 802.11n standards. The NFC operations may be configured to operate at a low frequency electrical signal, such as 13.56 MHz frequency electrical signal to perform NFC related functions. In this implementation, the coil antenna may be configured to independently resonate at 13.56 MHz, 2.4 GHz, and 5.2 GHz frequency electrical signals.

In an implementation, the coil antenna is configured to include an open ended center-fed dipole antenna section that resonates at 5.2 GHz, which is one of the frequencies used for the WLAN dual-band operations. Because the WLAN dual-band may further operate at 2.4 GHz, the coil antenna may be configured to resonate at 2.4 GHz by isolating segments of a continuous loop of coil antenna that is used for NFC related functions. In other words, reuse of partial traces of the NFC coil antenna is created during the 2.4 GHz frequency of operation by the WLAN dual-band.

In an implementation, the isolated segments of the NFC coil antenna may be utilized in combination with the center-fed dipole antenna section (i.e., used for 5.2 GHz frequency of operation) to resonate at 2.4 GHz frequency of operation by the WLAN dual-band. For NFC related functions, the coil antenna may use the NFC coil antenna (i.e., continuous loop of coil antenna) without the need for isolating the segments (i.e., partial traces). In other implementations, such as in the WWAN, LTE, digital television (DTV), GPS, etc. operations, the coil antenna may be configured to operate at the frequency electrical signals that correspond to the WWAN, LTE, DTV, GPS, etc. required frequency of operations.

In an implementation, passive devices or components (e.g., inductors) may be installed to isolate electrical signals of the WLAN dual-band operation from the NFC operations. In other implementations, a software implementation may use active devices (e.g., switches) to separate the WLAN dual-band electrical signal from the NFC electrical signal.

Example System

FIG. 1A illustrates an example arrangement of devices for near field coupling. More particularly, users may have a desire to operate near field coupling enabled devices and/or other devices in certain ergonomically convenient manners. Examples of such devices include (but are not limited to) mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like.

In an implementation, FIG. 1A shows a so-called "NFC bump" where two users (not shown) may "bump" their NFC-enabled devices 102-2 and 102-4 together in an edge-to-edge or head-to-head manner to perform NFC-related functions (e.g., information sharing). FIG. 1A shows an often desired side-by-side arrangement of the devices 102 for NFC related functions. The devices 102-2 and 102-4 may include a close ended continuous loop coil antenna (not shown) to perform the NFC related functions. The NFC related functions may include data communications between the devices 102. For example, the device 102-2 may transfer information to the device 102-4 through near filed coupling operations.

FIG. 1B illustrates an example arrangement for wireless communications between the device 102-2 and the device 102-4. The wireless communications may include the WLAN, MAN, WWAN, LTE, GPS, other WiFi form of communications, and the like. For example, the devices 102-2 and 102-4 may communicate with one another through adoption of the WLAN in their circuitry. In this example, the devices 102 may include a WLAN dual-band circuit (not shown) that utilizes the same continuous loop coil antenna to perform WLAN dual-band operation. The utilization of the continuous loop coil antenna (not shown) may be implemented independent of the use of the coil antenna for NFC related functions. The WLAN dual-band operation may operate at a different frequency electrical signal as compared to NFC frequency electrical signal.

In an implementation, the devices 102-2 and 102-4 may include a wireless communications circuit (not shown) that includes the coil antenna (not shown) for carrying, transmitting, and/or receiving frequency electrical signals. The wireless communication circuit (not shown) may be configured to operate in accordance with one or more wireless standards. For example, the wireless communication circuit (not shown) may be configured to wirelessly transfer information between the device 102-2 and the device 102-4 via a wireless communication link 104 (through a tower 106) that is established in accordance with at least one of a 3G or 4G, or future, digital wireless communication standard. Such a 3G or 4G (or future) digital wireless communication standard may include one or more of a WiMax communication standard (e.g., in accordance with the IEEE 802.16 family of standards such as IEEE 802.16-2009), a Third-Generation Partnership Project (3GPP) LTE communication standard, or one or more other standards or protocols (current and future). In an embodiment, the wireless communication circuit may be configured to wireless transfer information in accordance of a Wi-Fi WLAN standard, such as one or more of the IEEE 802.11 family of standards (e.g., IEEE. 802.11a-1999, 802.11b-1999, 802.11g-2003, 802.11n-2009, 802.11-2007), or one or more other standards or protocols (current and future).

Example Device

Figure 2:
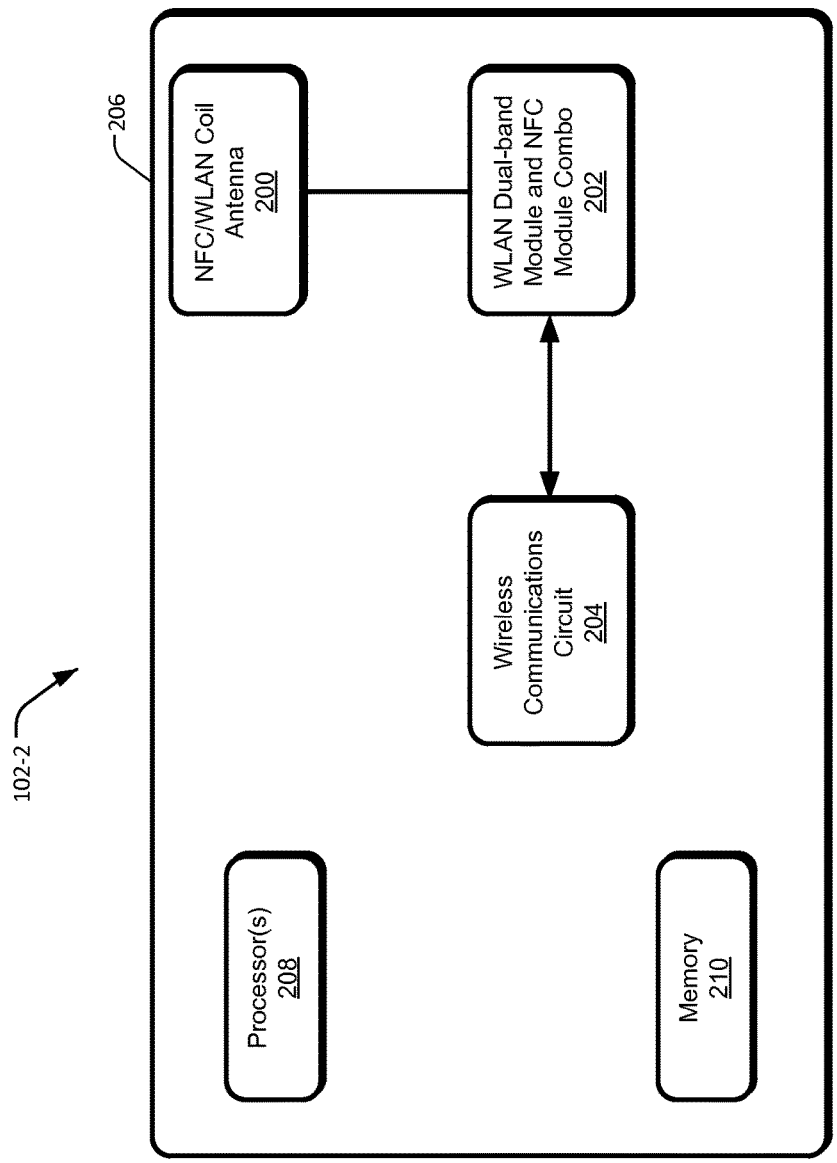
FIG. 2 is a diagram of an example device for wireless local area network (WLAN) dual-band and near field communications using the same coil antenna.

FIG. 2 is an example embodiment of the device 102-2 that utilizes the same coil antenna for NFC and WLAN dual-band operations. In an implementation, the wireless device 102-2 may include a NFC/WLAN coil antenna 200, a WLAN dual-band module and NFC module combo 202, and a wireless communications circuit 204.

In an implementation, the NFC/WLAN coil antenna 200 may be located at one edge (e.g., top edge 206) or any other edge of the device 102-2. In this implementation, the NFC/WLAN coil antenna 200 may function as a transceiver at WLAN frequency electrical signals and NFC frequency electrical signals. The NFC/WLAN coil antenna 200 may be configured to include a separate open ended center-fed dipole antenna configuration (not shown) to perform WLAN dual-band operation at 5.2 GHz frequency electrical signal. For 2.4 GHz frequency electrical signal, the NFC/WLAN coil antenna 200 may be configured to include reuse of partial traces (not shown) of the NFC/WLAN coil antenna 200 that is used for NFC related functions. For example, the NFC/WLAN coil antenna 200 may include the continuous loop coil antenna (not shown) for NFC related functions, such as reading NFC tags, credit cards, or transfer of information using the "NFC bump" between two NFC enabled devices.

In an implementation, the WLAN dual-band module and NFC module combo 202 may be configured to process the received, transmitted, and/or carried electrical signal from the NFC/WLAN coil antenna 200. The WLAN dual-band module and NFC module combo 202 is a single module that includes a WLAN dual-band module (not shown) and a NFC module (not shown). The WLAN dual-band module (not shown) processes the WLAN dual-band electrical signals, such as the 2.4 GHz/5.2 GHz frequency electrical signals, while the NFC module (not shown) processes the NFC electrical signal, such as the 13.56 MHz frequency electrical signal. The WLAN dual-band module and NFC module combo 202 may be coupled to a wireless communications circuit 204. In an implementation, the wireless communications circuit 204 may be configured to adjust communication parameters at the device 102-2, such as a transmit power, amplification, mode of operation, etc.

Furthermore, the device 102-2 includes one or more processor(s) 208. Processor(s) 208 may be a single processing unit or a number of processing units, all of which may include single or multiple computing units or multiple cores. The processor 208 may be implemented as one or more microprocessors, microcomputers, microcontrollers, digital signal processors, central processing units, state machines, logic circuitries, and/or any devices that manipulate signals based on operational instructions. Among other capabilities, the processor 208 may be configured to fetch and execute computer-readable instructions or processor-accessible instructions stored in a memory 210 or other computer-readable storage media.

In certain implementations, the memory component 210 is an example of computer-readable storage media for storing instructions, which are executed by the processor(s) 208 to perform the various functions described above. For example, memory 210 may generally include both volatile memory and non-volatile memory (e.g., RAM, ROM, or the like). Memory 210 may be referred to as memory or computer-readable storage media herein. Memory 210 is capable of storing computer-readable, processor-executable program instructions as computer program code that may be executed by the processor(s) 208 as a particular machine configured for carrying out the operations and functions described in the implementations herein.

The example wireless device 102-2 described herein is merely an example that is suitable for some implementations and is not intended to suggest any limitation as to the scope of use or functionality of the environments, architectures and frameworks that may implement the processes, components and features described herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Example NFC/WLAN Coil Antenna with Passive Devices

Figure 3:
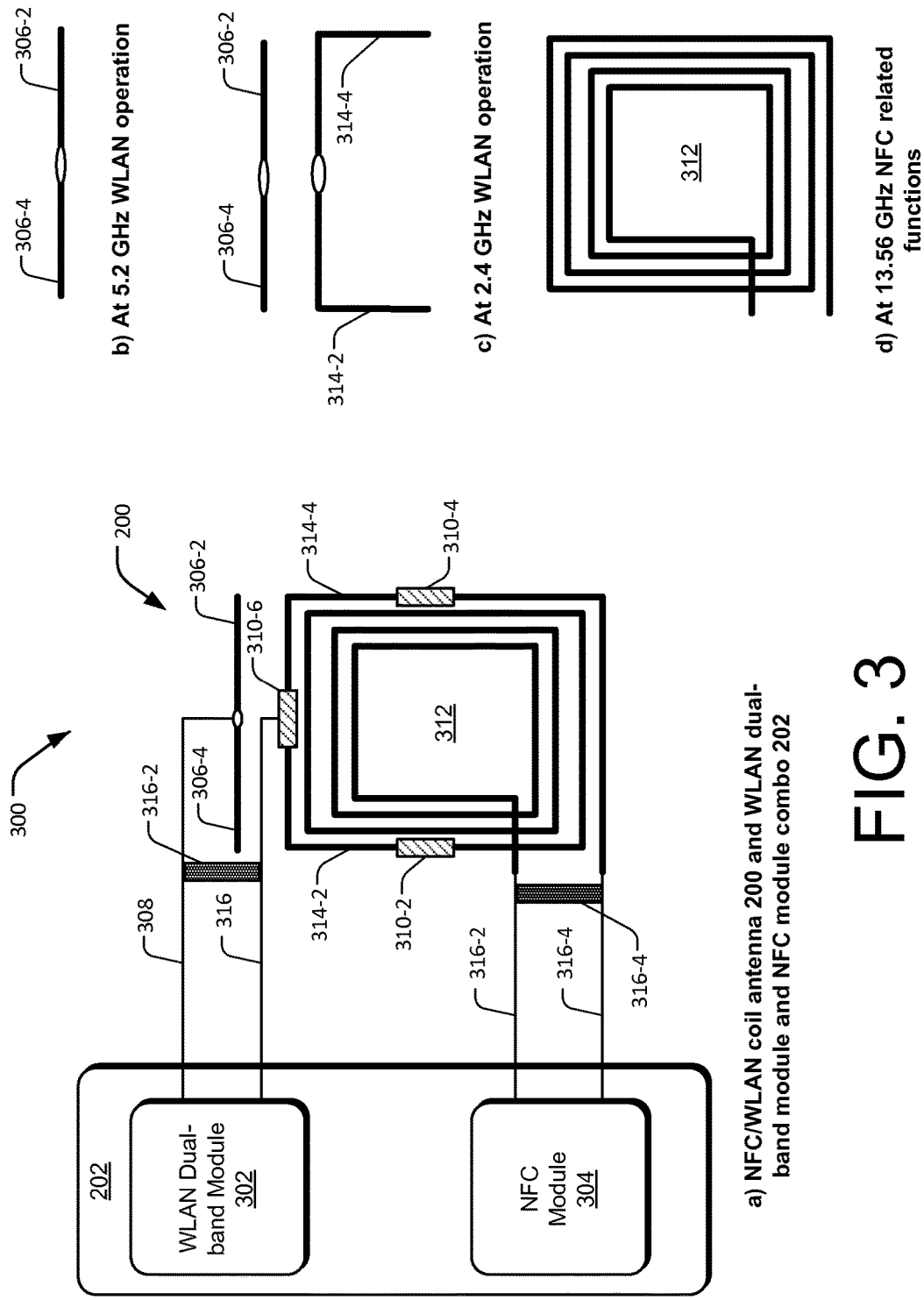
FIG. 3 is a diagram of an example coil antenna configuration that includes passive devices.

FIG. 3 is an example implementation 300 of NFC/WLAN coil antenna with passive devices. The emerging technologies related to near field coupling enable many appealing experiences for users of the device 102. For example, integrating a flexible printed circuit (FPC), which incorporates the NFC/WLAN coil antenna 200, into a device 102 may minimize the increase in the thickness of the device 102.

With continuing reference to FIG. 3 (a), the drawing illustrates a WLAN dual-band module 302 and a NFC module 304 that may be integrated to form a single module (i.e., WLAN dual-band module and NFC module combo 202). In an implementation, the WLAN dual-band module 302 may be configured to utilize the NFC/WLAN coil antenna 200 to carry, transmit, and/or receive the WLAN dual-band electrical signal. At the same time, the NFC module 304 may be configured to independently utilize the NFC/WLAN coil antenna 200 to carry, transmit, and/or receive the NFC electrical signal. The independent utilization of the NFC/WLAN coil antenna 200 by the NFC module 304 for NFC related functions may be implemented through installation of passive devices in the NFC/WLAN coil antenna 200.

In an implementation, the WLAN dual-band module 302 may be configured to operate at high frequency electrical signals, such as 2.4 GHz or 5.2 GHz electrical signals under IEEE 802.11n standard for WLAN dual-band operations. In other implementations, WLAN dual-band module 302 may be configured to operate at other frequency electrical signals that may correspond to its required function or operation. For example, in case of WWAN, LTE, DTV, GPS, etc. operations, the WLAN dual-band module 302 may be configured to operate on the frequencies that are used for operating the WWAN, LTE, DTV, GPS, etc. In this example, the WLAN dual-band module 302 may utilize (i.e., reuse) the same NFC/WLAN coil antenna 200 with the NFC module 304.

In an implementation, the NFC/WLAN coil antenna 200 may be configured to include a separate center-fed driven element 306 that may contain two metal coil conductors 306-2 and 306-4, which are oriented in parallel and collinear with each other. In other words, the two metal coil conductors 306-2 and 306-4 are in line with each other, such as in a dipole antenna configuration. In this implementation, the WLAN dual-band module 302 may use the center-driven element 306 to operate at 5.2 GHz frequency electrical signal. For example, the WLAN dual-band module 302 is connected through a link 308 to the NFC/WLAN coil antenna 200 that is configured to operate the center-driven element 306 for 5.2 GHz electrical signal only. In this example, the utilization of the NFC/WLAN coil antenna 200 for other NFC related functions or for the 2.4 GHz frequency electrical signal may co-exist at the same time. In an implementation, FIG. 3 (b) illustrates the NFC/WLAN coil antenna 200 configuration when operated at 5.2 GHz frequency electrical signal by the WLAN dual-band module 302. In this implementation, the center-fed driven element 306 is configured to resonate at 5.2 GHz frequency electrical signal to carry, transmit, and/or receive WLAN frequency electrical signals.

In an implementation, passive devices, such as inductors 310 may be installed at the NFC/WLAN coil antenna 200 in order to operate different frequency electrical signals at the same time. For example, inductors 310-2, 310-4 and 310-6 may be used to implement utilization of the NFC/WLAN coil antenna 200 at different frequency electrical signals, such as the 2.4 GHz, and 13.56 MHz frequency electrical signals. In this example, the inductor 310-6 is installed at a WLAN feed point of the link 316 to a rectangular loop coil antenna 312, while the inductors 310-2 and 310-4 are respectively installed at both ends of outer loop segments 314-2 and 314-4 of the rectangular loop coil antenna 312. The ends of the outer loop segments 314-2 and 314-4 are located opposite to the WLAN feed point of the link 316.

In an implementation, the inductors 310-2, 310-4 and 310-6 may be configured to include high impedance (i.e., high attenuation) at 2.4 GHz frequency electrical signal. In this implementation, the inductors 310-2, 310-4 and 310-6 may almost act as an open circuit. To this end, portions of the rectangular coil antenna segment 312 are isolated, such as the outer loop segments 314-2 and 314-4. In an implementation, the center-fed driven element 306 is combined with the segments 314-2 and 314-4 to resonate at 2.4 GHz frequency electrical signal of the WLAN dual-band module 302. FIG. 3 (c) illustrates the NFC/WLAN coil antenna 200 configuration that includes the combined center-fed driven element 306 and segments 314 during 2.4 GHz frequency electrical signal WLAN dual-band operation. The length of the segments 314 may be dynamically adjusted to resonate at the 2.4 GHz frequency electrical signal WLAN dual-band operation.

With continuing reference to FIG. 3 (a), the inductors 310-2, 310-4 and 310-6 may be configured to include low impedance (i.e., low attenuation) at NFC frequency of operation, such as 13.56 MHz frequency electrical signal. For example, the inductors 310-2, 310-4 and 310-6 may act as a short circuit so that the rectangular coil antenna segment 312 may be utilized for NFC related functions. In this example, the rectangular coil antenna segment 312 is connected to the NFC module 304 through a link 316. The NFC module 304 may be configured to resonate at 13.56 frequency electrical signals, such that only NFC related operations at 13.56 frequency electrical signal is processed by the NFC module 304. The center-fed driven element 306 of the NFC/WLAN coil antenna 200 is configured to resonate at 2.4 GHz or 5.16 GHz and as such, the center-fed driven element 306 may be operated independently of the rectangular coil antenna segment 312 during the NFC related operations. In an implementation, FIG. 3 (c) illustrates the NFC/WLAN coil antenna 200 configuration during NFC related operations at 13.56 frequency electrical signal. In this implementation, the rectangular coil antenna segment 312 is utilized to perform the NFC related operations and is independent from the WLAN dual-band operations.

In an implementation, a balun component 316 may be inserted at the WLAN feed at the end of links 308 and 316. The balun component 316 may provide a balanced feed in order to minimize return currents on outer conductor of coaxial cables that may be used in the links 308 and 316. For example, the balun component 316 is used to convert unbalanced coaxial feed to a balanced feed for the center-fed driven element 306. In devices 102, the balun component 316 is not always used, in which case, the coaxial cables used at the links 308 and 316 may also act as a radiating element and the final antenna radiation pattern is determined by the actual cable route in a chassis of the device 102. Similarly, the balun component 316 may be inserted at NFC feed at the end of link 316 that may use coaxial cables as described above.

In other implementations, active devices such as switches (not shown) may be configured to replace the passive devices, such as the inductors 310-2, 310-4 and 310-6. For example, during WLAN dual-band operation, the switches (not shown) that are installed in lieu of the inductors 310-2, 310-4 and 310-6 may be configured to include an open circuit. In another example, during NFC operation, the switches (not shown) that are installed in lieu of the inductors 310-2, 310-4 and 310-6 may be configured to include a short circuit. The active switches (not shown) may be configured to be controlled by a software mechanism, and may be dynamically controlled based on usage at the device 102. For example, if the center-fed driven element 306 is not used (e.g., used for 3G transmission), then the NFC/WLAN coil antenna 200 may be dedicated primarily for NFC related functions. As compared to the use of passive devices (i.e., inductors 310-2, 310-4 and 310-6), the active devices (e.g., switches) may be configured to switch back and forth in a time domain between performing the WLAN dual-band operation at a certain time, and performing the NFC related functions at another time.

Example Process

Figure 4:
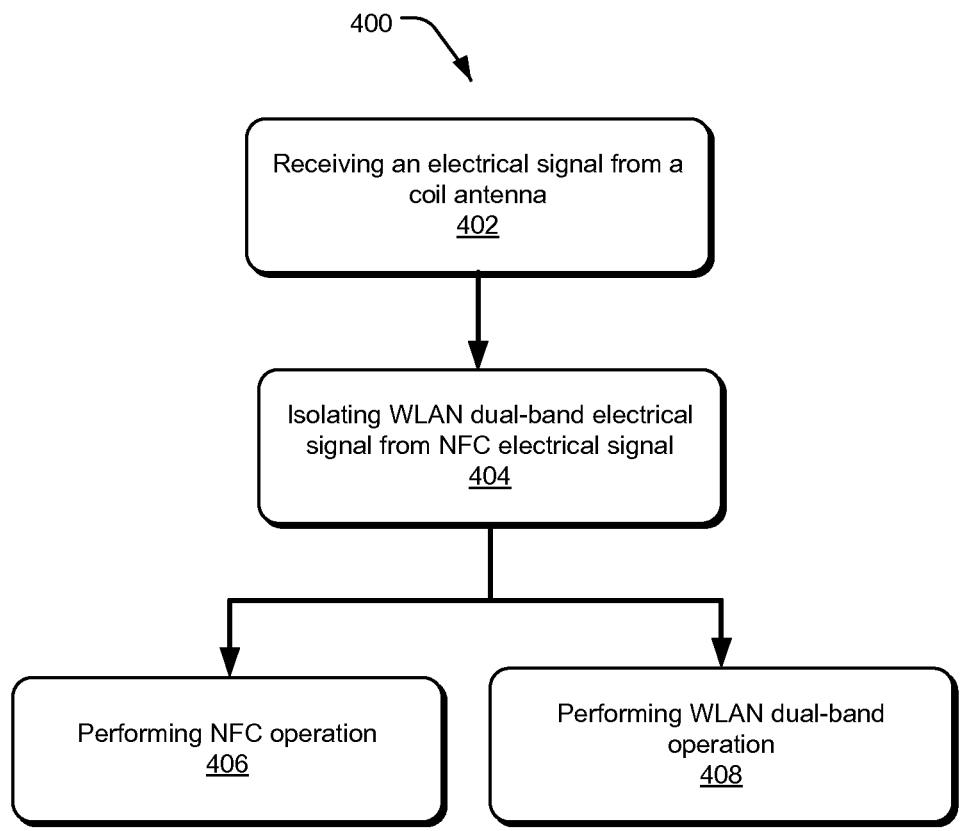
FIG. 4 is a method for wireless local area network (WLAN) dual-band and near field communications using the same coil antenna.

FIG. 4 illustrates an example process chart 400 illustrating an example method for concurrent WLAN dual-band and near field communications operations using the same coil antenna. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. For example, a computer accessible medium may implement WLAN dual-band operations and NFC operations by utilizing the same coil antenna.

At block 402, carrying, transmitting, or receiving a frequency electrical signal by a coil antenna is performed. In an implementation, the coil antenna (e.g., NFC/WLAN coil antenna 200) may include a rectangular multiple loop coil antenna. In this implementation, the NFC/WLAN coil antenna 200 may receive, carry, or transmit the frequency electrical signal that includes a WLAN dual-band frequency electrical signal and a NFC frequency electrical signal. For example, the WLAN dual-band frequency electrical signal may include a high frequency electrical signal (e.g., 2.4 GHz or 5.2 GHz) to implement WLAN dual-band operations. On the other hand, the NFC electrical signal may include a low frequency electrical signal (e.g., 13.56 MHz) to implement NFC related functions.

At block 404, isolating the WLAN dual-band frequency electrical signal from the NFC frequency electrical signal. Since the NFC electrical signal includes a different frequency of operation (i.e., 13.56 MHz) from the WLAN dual-band frequency electrical signal (i.e., 2.4 GHz/5.2 GHz), passive devices (e.g., inductors 310) may be used to separate the WLAN dual-band frequency electrical signal from the NFC frequency electrical signal. For example, the installation of the passive devices (i.e., inductors 310) may provide high attenuation (i.e., high impedance) at high frequency electrical signals (i.e., 2.4 GHz/5.2 GHz) such that, partial reuse (i.e., segments 314) of the NFC/WLAN coil antenna 200 may allow the WLAN dual-band operations.

In an implementation, a separate center-fed driven element (e.g., center-fed driven element 306) of the NFC/WLAN coil antenna 200 may be configured to resonate at 5.2 GHz frequency electrical signal. Furthermore, the center-fed driven element 306 in combinations with the segments 314 may be configured to resonate at 2.4 GHz frequency electrical signal. In another example, the installation of the passive devices (i.e., inductors 310) may provide low attenuation at 13.56 MHz frequency electrical signal during NFC related functions. In other words, the inductors 310 may act as low pass filter to 13.56 MHz frequency electrical signal so that NFC module (e.g., NFC module 304) may process the 13.56 frequency electrical signals independent of the 2.4 GHz/5.2 GHz frequency electrical signals for the WLAN dual-band operations. In other implementations, installation of active switches in lieu of the inductors 310 may be configured (e.g., by a software application) to isolate the WLAN dual-band frequency electrical signal from the NFC frequency electrical signal.

At block 406, performing NFC related function using the NFC frequency electrical signal is performed.

At block 408, performing WLAN dual-band function using the WLAN dual-band frequency electrical signal is performed.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A device comprising:
   a coil antenna comprising a plurality of wound loops having loop segments associated therewith, the coil antenna adapted to carry, transmit or receive an electrical signal, which includes an RF signal and a near field communications (NFC) electrical signal;
one or more components formed in respective loop segments of the coil antenna, the one or more components adapted to isolate the RF signal from the NFC electrical signal;
a NFC module adapted to process the NFC electrical signal, the NFC module utilizes the coil antenna that is configured to include a close ended coil antenna during NFC operation; and
a module adapted to process the RF signal, wherein the module reuses a segment of the close ended coil antenna during dual-band operation.

2. The device as recited in claim 1, wherein the one or more components include an inductor passive device installed at an outer loop segment of the close ended coil antenna, wherein the inductor passive device is configured to act as a short circuit when processing an NFC signal and as an open circuit when processing an RF signal.

3. The device as recited in claim 1, wherein the one or more components include an inductor passive device to separate the segment when combined with a separately installed center-fed dipole antenna, wherein the center-fed dipole antenna is configured to resonate at 5.2 GHz WLAN dual-band frequency electrical signal.

4. The device as recited in claim 1, wherein the module is combined with the NFC module to form a single module.

5. The device as recited in claim 1, wherein the coil antenna is combined with the module and the NFC module to form a single module.

6. The device as recited in claim 1, wherein the one or more components include active switches installed at an outer loop of the coil antenna to allow the reuse of the segment during the dual band operation, wherein the active switches are in closed state when processing NFC frequency electrical signals, wherein the active switches are in open state when processing dual-band frequency electrical signal.

7. The device as recited in claim 1, wherein the one or more components include active switches that are configured to switch back and forth in a time domain in performing the dual-band operation and the NFC operation.

8. The device as recited in claim 1, further comprising a balun component on a link between the WLAN dual-band module and the segment adapted to minimize return currents on outer conductor of a coaxial cable link.

9. The device as recited in claim 1, further comprising a balun component that is installed on a link between the NFC module and the segment adapted to minimize return currents on outer conductor of a coaxial cable link.

10. A device comprising:
a loop antenna adapted to carry, transmit or receive an electrical signal, which includes an RF signal and a near field communications (NFC) electrical signal;
one or more components adapted to isolate the RF signal from the NFC electrical signal; a NFC module adapted to process the NFC electrical signal, the NFC module utilizes the loop antenna that is configured to include a close ended loop antenna during NFC operation; and
a module adapted to process the RF signal, the module reuses a segment of the close ended loop antenna during dual-band operation,
wherein the one or more components include an inductor passive device to separate the segment that resonates at 2.4 GHz or 5.2 GHz WLAN dual-band frequency when combined with a separately installed center-fed dipole antenna.

11. A method for utilizing a near field communications (NFC) loop antenna for multiple radio signals comprising:
carrying, transmitting, or receiving an electrical signal by the loop antenna, the electrical signal includes an RF electrical signal and a NFC electrical signal;
isolating the RF electrical signal from the NFC electrical signal, the loop antenna is configured to include a continuous loop of antenna during NFC operation, the loop antenna is configured to reuse a partial trace of the continuous loop of antenna during dual-band operation, wherein the partial trace of the continuous loop of antenna is combined with a separately installed center-fed dipole antenna to resonate at a dual-band frequency;
performing the NFC operation utilizing the continuous loop of antenna; and
performing the dual-band operation utilizing the partial trace of the continuous loop of antenna.

12. The method as recited in claim 11, wherein the isolating includes an inductor in the continuous loop of antenna to separate the partial trace during the dual band operation, wherein the inductor acts as a short circuit at NFC frequency and as an open circuit at dual-band frequency.

13. The method as recited in claim 11, wherein the center-fed dipole antenna is configured independently to resonate at 5.2 GHz WLAN dual-band frequency electrical signal.

14. At least one non-transitory computer accessible medium that performs a method utilizing a near field communications (NFC) loop antenna for multiple radio signals comprising:
carrying, transmitting or receiving an electrical signal by the loop antenna, the electrical signal includes a wireless local area network (WLAN) electrical signal and a NFC electrical signal;
isolating the WLAN electrical signal from the NFC electrical signal, the bop antenna is configured to include a multiple loop antenna during NFC operation, the loop antenna is configured to reuse a partial trace of the multiple loop antenna during WLAN dual-band operation;
performing the NFC operation utilizing the multiple loop coil antenna; and
performing the WLAN dual-band operation utilizing the partial trace of the multiple loop antenna,
wherein the isolating includes using an inductor passive device in the multiple loop antenna to separate the partial trace during the WLAN dual band operation, wherein the inductor passive device acts as a short circuit at 13.56 MHz NFC frequency electrical signal and as an open circuit at 2.4 GHz WLAN dual-band frequency electrical signal.

15. The computer accessible medium as recited in claim 14, wherein the partial trace of the multiple loop antenna is combined with a separately installed center-fed dipole antenna to resonate at 2.4 GHz WLAN dual-band frequency electrical signal.

16. The computer accessible medium as recited in claim 14, wherein the partial trace of the multiple loop antenna is combined with a separately installed center-fed dipole antenna, wherein the center-fed dipole antenna is configured separately to resonate at 5.2 GHz WLAN dual-band frequency electrical signal.

17. The computer accessible medium as recited in claim 14, wherein the isolating uses active switches to separate the partial trace during the WLAN dual band operation, wherein the active switches are in closed state when processing NFC frequency electrical signal, wherein the active switches are in open state when processing WLAN dual-band frequency electrical signal.

18. The computer accessible medium as recited in claim 14, wherein the isolating includes the use of active switches that are configured to switch back and forth in a time domain in performing the WLAN dual-band operation and the NFC operation.

19. The computer accessible medium as recited in claim 14, further comprising using a balun at a link between a WLAN dual-band module and the partial trace to minimize return currents.

20. The computer accessible medium as recited in claim 14, further comprising using a balun between a NFC module and the multiple loop antenna to minimize return currents.

\* \* \* \* \*